United States Patent [19]

Chikazawa

[11] Patent Number: 5,209,185

[45] Date of Patent: May 11, 1993

[54] ARTIFICIAL LITTER FOR PETS COMPRISING TAPIOCA

[76] Inventor: Osamu Chikazawa, 1-5-13, Nipponbashi, Chuo-Ku, Osaka, Japan, 540

[21] Appl. No.: 917,839

[22] Filed: Jul. 21, 1992

[30] Foreign Application Priority Data

Jul. 31, 1991 [JP] Japan .................................. 3-216111

[51] Int. Cl.$^5$ ............................................. A01K 29/00
[52] U.S. Cl. ....................................................... 119/171
[58] Field of Search ................................ 119/171, 172

[56] References Cited

U.S. PATENT DOCUMENTS

| | | |
|---|---|---|
| 2,179,591 | 11/1939 | Godchaux . |
| 4,206,718 | 6/1980 | Brewer . |
| 4,296,234 | 10/1981 | Mindt et al. ...................... 604/904 |
| 4,437,429 | 3/1984 | Goldstein et al. ................. 119/173 |
| 4,519,340 | 5/1985 | Dickey ................................ 119/171 |
| 4,924,808 | 5/1990 | Pirotto .............................. 119/171 |
| 4,925,826 | 5/1990 | Hamm et al. ..................... 119/171 |
| 5,109,804 | 5/1992 | Chikazawa ....................... 119/171 |

FOREIGN PATENT DOCUMENTS

| | | | |
|---|---|---|---|
| 1015233 | 8/1977 | Canada ............................. 119/171 |
| 2451159 | 11/1980 | France ............................. 119/171 |
| 2627102 | 4/1987 | France . | |

*Primary Examiner*—Gene Mancene
*Assistant Examiner*—Todd E. Manahan
*Attorney, Agent, or Firm*—Brumbaugh, Graves, Donohue & Raymond

[57] ABSTRACT

An artificial litter for pets is prepared by kneading grains of tapioca and corn obtained from refined tapioca powder and corn in a humidified grain cracking machine, or expander. The kneaded tapioca and corn is then expelled under pressure through a nozzle and allowed to expand under reduced pressure and then cut to form tapioca-corn pellets. The pellets are subsequently coated or filled with zeolite powder and/or powdered additives.

4 Claims, 1 Drawing Sheet

ARTIFICIAL LITTER FOR PETS COMPRISING TAPIOCA

BACKGROUND OF THE INVENTION

This invention relates to a litter material designed for receiving urine and feces left by domestic pets, particularly small animals such as dogs, cats, mice and birds, that are kept in family homes or otherwise raised indoors. More particularly this invention relates to an artificial litter that can easily be laid in, for example, a pet's litter box or sleeping basket.

In order to dispose of the urine and feces of pets kept in family homes or otherwise raised indoors, it has long been the practice to line the bottoms of the litter boxes and sleeping baskets of such pets with materials such as well dried sand or newspapers cut up into small pieces, dry sawdust, dried grass and the like. Other known materials which are used as artificial litters include those types of plastic particulates that are sometimes referred to as "artificial sand" and pulps, which are first processed and then treated to increase their absorption and odor-prevention characteristics, and also the cut and processed fibers that constitute the sediment left when sugar cane has been squeezed as disclosed in U.S. Pat. No. 2,179,591. As can be seen from U.S. Pat. No. 4,437,429, and U.S. Pat. No. 5,109,804, zeolite has outstanding ammonia absorption properties and a high deodorization capacity.

It has always been necessary once pet litter has been soiled by the animal, to dispose of part or all of the soiled litter and to replace it with clean litter material. However, while conventional litter materials of the type described above have proved fairly adequate in terms of their ability to absorb pets' urine and feces, pet owners have always needed to take very great care when disposing of such soiled litter materials in view of the tendency of these materials to cause blockages in wastewater pipes and sewers if disposed of directly into flush toilets or wastewater systems. Although some litter materials can be disposed of down flush toilets in cases where soiling is extremely limited, these materials nevertheless cause blockages if large quantities of the materials are disposed of at the same time.

As a result, some pet owners have even been forced to slip soiled litter materials in with their regular garbage, or to surreptitiously dispose of the soiled litter materials by the road side, in empty lots or even directly into the wastewater system.

The disposal of soiled litter materials, which give out offensive smells and harbor bacteria, destroys the sanitary and wholesome nature of the environment in the vicinity of the disposed materials and thus contributes to environmental pollution.

SUMMARY OF THE INVENTION

It is the primary object of the present invention to provide an artificial litter material which is both effective in absorbing the water content and offensive odors that are part and parcel of the urine and feces left by pets, and which will also dissolve immediately and be carried away with ease if disposed of directly into a flush toilet or a wastewater system.

It is another object of the invention to provide an artificial litter material of a suitable weight to allow it to be inserted with ease into a pet's litter box or sleeping basket such that it can subsequently be easily placed in a location best suited for such use by pets.

It is a further object of the invention to provide an artificial litter material which will neither decay nor become moldy but will remain clean even if only the soiled parts of said litter material are replaced each day over a long period, and which is non-toxic so that it will not cause problems even if it is swallowed by mistake by the pet.

In order to achieve the objects outlined above, the present invention makes use of means whereby lumps of tapioca or a 95:5 to 70:30 by weight tapioca-corn mixture are initially heated under pressure in a humid atmosphere inside a grain cracking machine and kneaded together. The kneaded tapioca or tapioca/corn grains are then expelled under pressure through a nozzle of diameter 1 mm to 5 mm into the air and allowed to expand or puff at reduced pressure then cut with a cutter to form pellets. The tapioca or tapioca-corn grains may be pretreated by addition of moisture, size reduction, heating and combinations thereof prior to heating and expulsion under reduced pressure set forth hereinabove. The pellets, while their surfaces are still moist, are then introduced into a separate tank of additive such as an inorganic alumina-silicate powder for example, zeolite, of which the general expression is given as $MeO.Al_2O_3.SiO_2.H_2O$, wherein Me is Na, K or Ca, for coating the powder to between 3% and 50% of each pellet's weight and subsequently dried. The zeolite coating increases the bulk density of the pellets by at least 10 to 20%.

Such an aftertreating material contributes to the avoidance of the lumping tendency of the grains as well as of subsequent inconvenience to handling such highly bulky, fluffy granules in addition to providing the litter material with the additional capacity to absorb offensive odors. Therein further, small amounts of one or more types of additives, such as agents for the enhancement of deodorization characteristics, colorants, decay prevention agents and preservatives, can be introduced into the pellets in addition to the aforementioned zeolite powder.

DESCRIPTION OF THE PREFERRED EMBODIMENT

Figure 1:
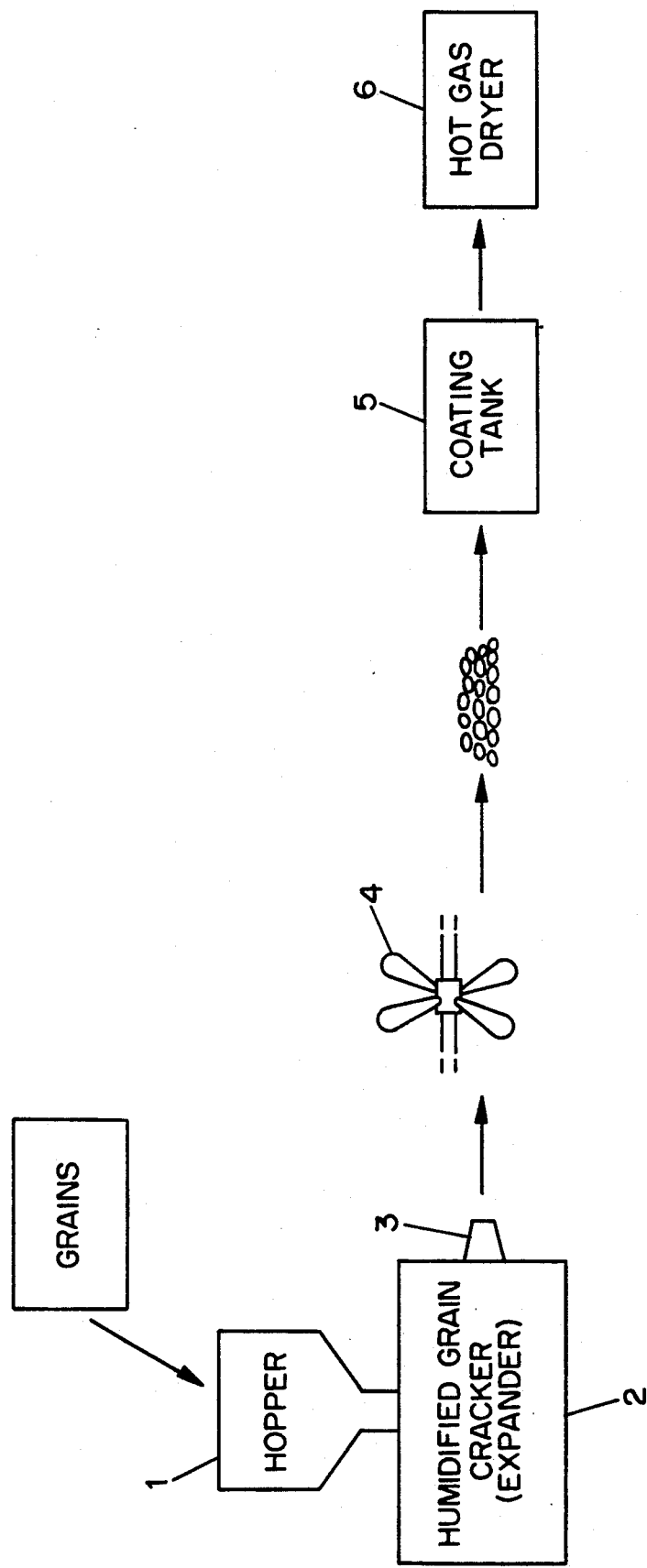
FIG. 1 is a block diagram illustrating a method of manufacturing litter material according to the invention.

Plant materials such as tapioca and corn may be employed as a starting material in the manufacture of the litter material of this invention, and in the following the term "grains" represents either tapioca or tapioca-corn in a weight ratio of 95:5 to 70:30. Preferably, the tapioca which is used as the absorbent material of the invention consists of a fine powder, made from the cassava root for use as human food or as animal feed. The grains are made by first refining the tapioca or corn into a powder and then adding water to the resultant powder to make it into a paste which is then rolled down over a hotplate at between 120° and 50° C. causing it to form dry lumps of between 1 mm and 10 mm, preferably 1 to 2 mm in diameter.

In the case of a tapioca-corn mixture the tapioca and corn lumps are then mixed in a blender and have a particle size of 1-2 mm in diameter. Optionally, 0.1 to 20% may be added to the tapioca and corn lumps in the blender. With reference to FIG. 1, the tapioca or mixed tapioca-corn grains are moved into the hopper 1 of an expander 2. Optionally, 0.1 to 20% by weight water, preferably 1 to 20% by weight water is sprayed onto the tapioca or tapioca corn grains in the hopper. The expander, or humidified grain cracker, is of conventional construction. The expander is essentially an extruder which cooks the tapioca or tapioca-corn grains with steam and water under pressure and causes the grains to become gelatinized. The resulting product is extruded out of a pressurized ejection nozzle 3. The mouth of the nozzle has a diameter of between 0.5 mm and 5 mm, preferably 0.5 to 1.5 mm, and may be any of a variety of shapes including circular, polygonal, star shaped or clover shaped according to the user's preference. The nozzle need not be restricted to a single mouth and may equally comprise a plurality of mouths in the form of a sliced lotus root, for example. A rotary cutter 4 set in front of the mouth of the pressure nozzle 3 of the aforementioned grain cracker or expander 2 cuts the extruded material into pellets 4–6 mm in diameter. A tank 5 contains either zeolite powder or else zeolite powder mixed with one or more powdered additives as required. The grains are then dried in a hot gas dryer 6.

A preferred litter material in accordance with the invention is illustrated in the following example.

EXAMPLE 1

The tapioca and corn are each separately pretreated as follows. The tapioca and corn are each dried and smashed, and enough water is added to make a paste. The paste is then passed through a fine sieve, and dropped on a heated steel board at a temperature of 120°–150° C. which transforms the paste to a plurality of lumps having a rough diameter in the range of 1–2 mm. The pretreated tapioca and corn are then added to a blender with moisture.

Corn and tapioca lumps are poured into the hopper 1. The humidified grain cracker 2 then mixes and polishes the tapioca and corn lumps under conditions of high temperature, 100° to 150° C., and humidity while at the same time applying a pressure of 110 to 150 p.s.i. to the mixture to produce a tapioca and corn paste. The paste is then ejected under pressure from a nozzle 3 at which point the tapioca and corn grains swell or puff to from three to 10 times their previous size as they abruptly encounter the lower pressure conditions outside the grain cracker 2. The rotary cutter 4 then cuts the tapioca and corn paste into pellets having a diameter of 4 to 6 mm. Converted into volumetric terms, 1 kg of the tapioca and corn lumps as described above, could be expected to produce anything from eight to 18 liters of tapioca-corn pellets.

Next, while the tapioca-corn pellets are still hot and their surface is moist, they are introduced into the powder tank 5 where, with the help of the adhesive characteristics of the pellets, the surface of each of said pellets is thoroughly and completely coated with zeolite powder. Optionally, additional moisture may be added to the pellets using a spray gun to improve adhesion. The coated pellets are then passed through the hot gas dryer 6 to dry them and they are then ready for use as materials for pets' litters. The corn starch in the litter material is highly absorbent and minimizes shrinkage of the litter material upon contact with moisture.

In the preferred embodiment of the invention described above, the surface of the granulated tapioca or tapioca-corn pellets are coated with zeolite and such other additives as may be deemed necessary. The effective operation of the litter materials of the invention would be unaffected, however, if the appropriate quantity of zeolite powder alone or in combination with such powdered additives as may be deemed necessary were to be incorporated into the tapioca or tapioca-corn pellets prior to kneading in the aforementioned humidified grain cracker 2.

The coating of the tapioca or tapioca-corn pellets with, or the inclusion inside the tapioca or tapioca-corn pellets of, zeolite powder of between 3% and 50% of the weight of the individual pellets not only ensures the effectiveness of the pellets' absorption characteristics but is also the most cost effective means of doing so.

Of the additives that are mixed with the zeolite powder, the addition of a suitable amount of ferrous sulfate, a recognized food additive, to act as a deodorizing agent is extremely effective in increasing the ammonia adsorption characteristics of the litter material. Other recognized food additives, such as colorants, antiseptics, agents for the prevention of decay and preservatives, may also be combined with the zeolite powder as required.

When the artificial litter materials of the invention, manufactured in accordance with the manufacturing method outlined above, are laid to a depth of between 2 cm and 5 cm in the soil box or sleeping basket of a pet, the outstanding capacity of each of the tapioca or tapioca-corn pellets to absorb moisture and water serves to ensure the immediate absorption of the water content of any urine or feces left by said pet. At the same time, the zeolite powder which is contained in appropriate quantities in each of said tapioca or tapioca-corn pellets either in the form of a surface coating or actually inside the pellets, not only enables the materials to be laid comfortably in the litter box or sleeping basket but also has the effect of deodorizing the area by adsorbing and reducing the sorts of offensive smells that emanate from the ammonia contained in the urine or feces. Moreover, since the zeolite is applied only in comparatively small quantities and takes the form of a fine particulate, it is possible simply to dispose of soiled litter materials into a flush toilet or else directly into a wastewater system. Furthermore, all the materials of the invention are natural and harmless to humans and animals with the result that there is no danger to the health of a pet even it if inadvertently swallows any of said materials. When the tapioca or tapioca-corn granules are dropped into water, they make a small sizzling sound as they absorb water and then, after several tens of seconds, they assume a soggy sort of texture soft enough to flush away with the water into which they have been dropped. When inside the wastewater system, the zeolite powder continues to perform a useful service as it absorbs offensive smells within the wastewater system itself. The tapioca or tapioca-corn constituents, on the other hand, are broken down and digested by bacteria in the wastewater system, thereby returning them to their natural state, which is a distinct plus in environmental terms.

Not only do the pet's litter materials of the invention serve to keep pets' litter boxes and sleeping baskets fresh and clean but the materials with additives, such as deodorizing agents, colorants and preservatives, also contain only very small amounts of such additives with the result that the materials' moisture and water absorption characteristics and their water solubility characteristics do not in any way constitute negative elements. The litter materials of the invention to which this type of additive has been added thus have a much higher value added content compared to products which have not been treated in this manner.

I claim:

1. A litter material for pet animals manufactured by the process comprising the steps of heating grains selected from the group consisting of tapioca or a mixture of tapioca and corn in a weight ratio of 95:5 to 70:30 under pressure, expanding said grains into the atmosphere whereby said grains are puffed, pelletizing the puffed grains, and coating the grains thus treated with an inorganic powder material of zeolite in a range of 3-50 parts thereof for 100 parts of the grains, wherein the tapioca and corn grains are pretreated by the steps of:

(a) drying and reducing in size;

(b) adding water to the dried and size-reduced grains to obtain a paste; and (c) passing the paste through a fine sieve and heating the sieved paste at a temperature in the range of 120°-150° C. to transform the paste into a plurality of lumps having a diameter in the range of 1-2 millimeters.

2. A litter material according to claim 1, wherein additives selected from the group consisting of antiseptics, colorants, and mixture thereof are incorporated.

3. A litter material according to claim 1 wherein the grains are tapioca.

4. A litter material according to claim 1 wherein the grains are a mixture of tapioca and corn in a weight ratio of 95:5 to 70:30.

* * * * *

UNITED STATES PATENT AND TRADEMARK OFFICE
CERTIFICATE OF CORRECTION

PATENT NO. : 5,209,185
DATED : May 11, 1993
INVENTOR(S) : Osamu Chikazawa

It is certified that error appears in the above-identified patent and that said Letters Patent is hereby corrected as shown below:

Column 2, line 67 to column 3, line 1, "Optionally, 0.1 to 20% may be added to the tapioca and corn lumps in the blender" should read --Optionally, 0.1 to 20% by weight moisture, preferably 1 to 20% by weight moisture, may be added to the tapioca and corn lumps in the blender--;

Signed and Sealed this

Twelfth Day of April, 1994

Attest:

BRUCE LEHMAN

*Attesting Officer*                     *Commissioner of Patents and Trademarks*